April 22, 1930.                G. COLUCCI                1,755,914
    DEVICE FOR TRANSFORMING A UNIFORM ROTARY MOTION INTO AN ALTERNATING
              MOTION WITH DIFFERENT SPEEDS IN TWO DIRECTIONS
                            Filed May 2, 1929
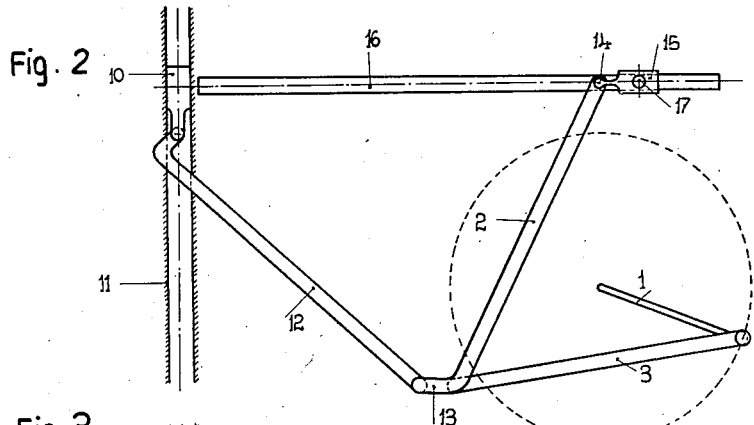
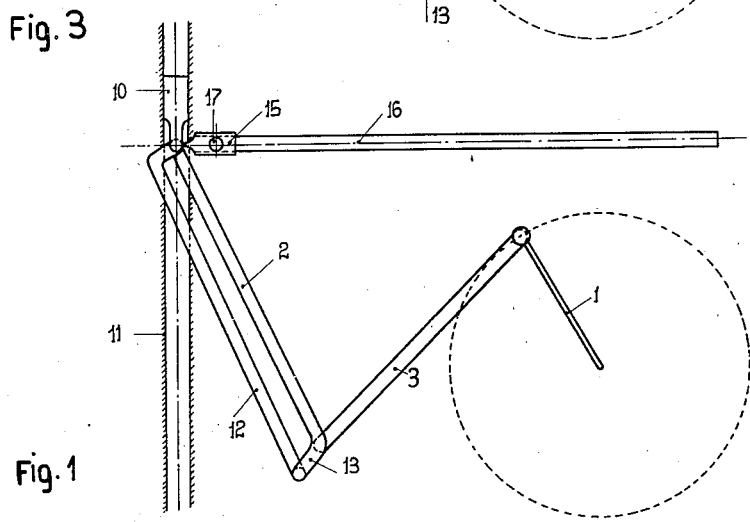
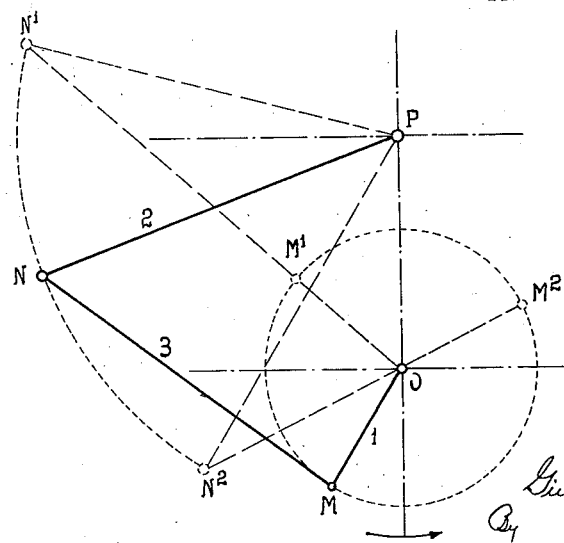
Inventor
Giuseppe Colucci,
By Henry Orth Jr.
            Atty.

Patented Apr. 22, 1930

1,755,914

UNITED STATES PATENT OFFICE

GIUSEPPE COLUCCI, OF NAPLES, ITALY

DEVICE FOR TRANSFORMING A UNIFORM ROTARY MOTION INTO AN ALTERNATING MOTION WITH DIFFERENT SPEEDS IN TWO DIRECTIONS

Application filed May 2, 1929, Serial No. 359,842, and in Italy May 3, 1928.

In several mechanical applications, more particularly in some kinds of machine-tools (planing, shaping and other machines) a member performs an alternating either rectilinear or rotary motion, and it is desirable to effect the stroke in one direction at a speed different from the stroke in other direction. This has been obtained heretofore by more or less complicated mechanisms which owing to passive resistances absorb a large amount of the energy supplied to the machine. According to this invention I obtain the desired effect by the use of a special articulated parallelogram, by which I can obtain a considerable difference between the two speeds of oscillation in one direction and in the other, by simple means and a small consumption of power owing to passive resistances. My device comprises a crank performing a uniform rotary motion and a swing arm, the two rotations and oscillation axes being parallel and the distance between them exceeding the crank radius. To the crank pin is articulated the head of a connecting rod, the foot whereof is articulated to the swing arm, the length of the connecting rod not exceeding the length of the arm. The swing arm under the rotation of the crank carries out oscillations of which the width depends, at equal distance between both axes (rotation axis of the crank and oscillation axis of the arm) from the length of the connecting rod and the crank radius. The different periods of the two half oscillations depend, under other equivalent conditions, upon the position of the swing arm with respect to the axis of the crank, the duration of one total oscillation being evidently equal to the duration of one crank revolution. With respect to the oscillation the crank revolution is divided into two parts of different angular width, each of which corresponds to half an oscillation of the arm, so that two half-oscillations have different periods, i. e. are performed at different average speed.

The accompanying drawing shows, by way of example, a diagram of the device according to this invention as well as a constructional form of same.

Figure 1 is a diagram showing the essential parts of the device.

Figures 2 and 3 show diagrammatically a construction of the device for actuating a quick return slide in the positions of maximum and zero stroke, respectively.

With reference to Figure 1, a crank 1 having the axis O and the pin M performs a uniform motion; an arm 2 can oscillate about the axis P parallel to the axis O and at a distance from this latter greater than the crank radius O M. A connecting rod 3 is articulated by its head to the crank pin M and by its foot to a point N of the arm 2. The articulated parallelogram O M N P utilized according to this invention has OM OP MN PN. While the pin M of the crank 1 describes a circle by a uniform motion, any point whatever of the arm 2 describes a whole angular oscillation; e. g. the point N oscillates from a point $N_1$ to a point $N_2$ and vice versa. To the former corresponds the position $M_1$ of the crank pin, to the latter the position $M_2$.

While the crank pin M passes in the direction of the arrow from the point $M_1$ to the point $M_2$, the hinge N of the rod foot passes from the point $N_1$ to the point $N_2$: while the crank pin passes always by a uniform motion from the point $M_2$ to the point $M_1$, the hinge N resumes the position $N_1$ from $N_2$. It is clear that the two half-oscillations being of equal width and having a period proportional to the angles $M_1$ O $M_2$ and $M_2$ O $M_1$ they will be effected at different speeds. By the simple displacement of the point P, i. e. of the axis of oscillation of the arm 2, it is possible to vary the difference between the two speeds and the width of the oscillation $M_1$ O $M_2$. This displacement may take place even while the machine is working which may be of great advantage; moreover I can vary the crank radius by displacing the pin M in a suitable guide as in the ordinary crank mechanisms.

Referring to Figures 2 and 3, 10 denotes a slide movable in the guide 11 and connected by a rod 12 to the head 13 of the swing arm 2, of which the hinge 14 is carried by a slide 15 that may be displaced in the guide 16 and clamped in any desired position by the set screw 17. To the head 13 is also connected the crank 1 by means of the rod 3.

By this arrangement the alternating curvilinear motion of the point N, Figure 1, is transformed into a rectilinear motion of the slide 10, which may be a part of any machine-tool, for instance of a planing machine. When the hinge 14 of the arm 2 is displaced downwardly, i. e. it is removed from the path of the slide 10, the width of the stroke of this latter increases, while with the opposite motion of the hinge 14, the width of the stroke decreases reaching nought when the slide 15 comes into contact with the guide 11.

This improved device is adapted to replace the known mechanism for ensuring an accelerated idle return stroke in machine tools as planing, shaping, sawing machines, and, being of most simple construction is suitable for a number of other novel uses.

Moreover in working machines where it was not possible till now to adopt two different speeds for the forwards and return stroke owing to the clumsiness of the known mechanisms, as in hammers, packing, stamping, punching machines, my device can be used and gives a considerable economy in time as each working cycle can be shortened by reducing the duration of the idle return stroke of the operating member.

The form, size, construction of the parts of my mechanism may be varied without departing from the spirit of this invention.

What I claim is:

Device for transforming a circular uniform motion into an alternating motion with a speed in one direction different from the speed in the other direction, comprising a crank, a swing arm pivoted at a distance from the axis of rotation of the crank greater than the crank length, a connecting rod which connects the free ends of the crank and swing arm and having an intermediate length between the length of the crank and that of the swing arm, a slide, a guide in which said slide is movable, a link connecting said slide with the end of the swing arm, a second slide carrying the hinge for the swing arm, a guide for said slide substantially perpendicular to the guide mentioned above and a set screw for fixing said second slide in the adjusted position.

In testimony that I claim the foregoing as my invention, I have signed my name.

ING. GIUSEPPE COLUCCI.